UNITED STATES PATENT OFFICE.

ELIZA J. FIELD, OF WALTHAM, MASS., EXECUTRIX OF FRANCIS FIELD.

IMPROVED COMPOSITION FOR CLEANSING THE TEETH.

Specification forming part of Letters Patent No. 50,110, dated September 26, 1865.

*To all whom it may concern:*

Be it known that FRANCIS FIELD, late of Waltham, in the county of Middlesex and State of Massachusetts, (deceased,) did invent an Improved Compound for Cleansing the Teeth, termed "Prophylactic Dentifrice," of which the following is a full, clear, and exact description.

This invention has for its object to produce a compound for cleansing the teeth and preventing their decay; and it consists in mixing together carbonate of lime, orris-root, super-carbonate of soda, and powdered sugar, a suitable essence being added, if desired, to give it the required scent.

To enable others skilled in the art to understand and use this invention, the manner in which it is carried out will now be described.

Take eighty parts, by weight, of carbonate of lime, finely ground and sifted, six parts powdered orris-root, five parts of super-carbonate of soda, eight parts of powdered sugar, one part of oil of wintergreen, or a sufficient quantity of any suitable essence to give the required scent or flavor; the whole of them mixed together and thoroughly incorporated, after which the mixture is sifted with a fine sieve, and is then ready for use.

The exact proportions above stated may be somewhat varied without departing from the spirit of the invention; or the sugar may be left out entirely, if preferred, and a good result be obtained. The proportions first mentioned, however, have been found to be the best.

What I claim as the invention of the said FRANCIS FIELD, deceased, and desire to secure by Letters Patent, is—

The within-described dentifrice, made of the materials specified and mixed together in about the proportions set forth.

ELIZA J. FIELD,
*Executrix.*

Witnesses:
P. E. TESCHEMACHER,
W. J. CAMBRIDGE.